Sept. 11, 1956

L. G. WALLER 2,762,889

THERMAL SWITCH

Filed May 23, 1955

INVENTOR
Lyle G. Waller

BY W. E. Thibodeau, A. W. Dew and M. W. Bachrach ATTORNEYS

United States Patent Office 2,762,889

Patented Sept. 11, 1956

2,762,889

THERMAL SWITCH

Lyle G. Waller, Clinton, Ill., assignor to the United States of America as represented by the Secretary of the Army

Application May 23, 1955, Serial No. 510,589

2 Claims. (Cl. 200—142)

The invention described herein may be manufactured and used for the Government for governmental purposes without the payment of any royalty thereon.

This invention relates to thermal electrical switches and more particularly to a type switch adapted to function when exposed to a temperature environment above a predetermined present minimum.

One object of this invention is a new and novel thermal electric switch.

Another object is a switch adapted to function in a predetermined preset temperature environment.

A further object is a switch whose temperature of function is sharply defined.

An additional object is a thermal switch adapted for economical mass production.

The specific nature of the invention as well as other objects and advantages thereof will clearly appear from the following description and drawings wherein.

Figure 1:
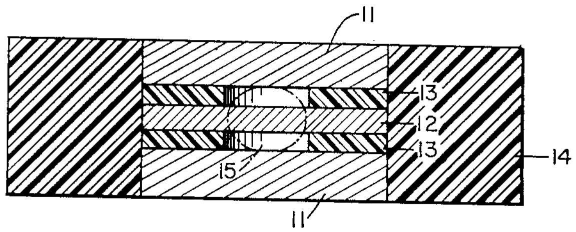
Figure 1 is an axial sectional view of the invention.
Figure 2:
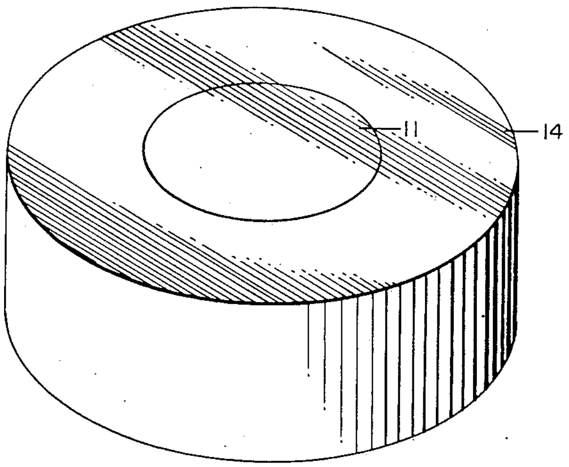
Figure 2 is a perspective view of the device shown in Fig. 1.

The switch of this invention, one application of which is a thermal detector for a fire alarm system, comprises a pair of parallel spaced contacts or terminals 11, 11 having a thin disc of solder 12 disposed therebetween. Disposed between and separating the solder disc from the terminals are a pair of thin centrally perforated insulating spacer washers 13, 13 formed of a non-wetting material such as silicone coated fiberglass. Sleeve 14, also of a non-wetting type insulating material, houses the other elements of the invention. The terminals 11, 11; disc 12; washers 13, 13; and sleeve 14 are all coaxial.

The temperature at which the switch will function is solely dependent upon the melting temperature of the solder alloy material used. A type solder can be selected in manufacture to provide the function temperature desired.

When the invention is subjected to the function temperature, solder disc 12 melts. Inasmuch as molten solder attempts to form a sphere, a ball 15 is formed. Sleeve 14 and washers 13, 13, being a non-wetting material, do not resist the formation of the ball. Inasmuch as washers 13, 13 are thin, the solder will pass through the perforations provided therein to wet terminals 11, 11 and provide an electrical conductive path therebetween to function the switch.

It will be apparent that the embodiment shown is only exemplary and that various modifications can be made in construction and arrangement within the scope of the invention as defined in the appended claims.

I claim:

1. A thermal switch comprising: a disc of solder; an insulating washer on each side of said disc of solder, said washer being coaxial and of a material non-wettable by said solder when said solder is melted; and metal contacts against the face of each washer remote from the solder; so constructed and arranged that said solder upon melting is adapted to form a ball as a result of surface tension and to make eletcrical contact with both of said plates independently of gravity and regardless of the orientation of the switch.

2. A thermal switch comprising: a sleeve of non-wetting insulating material, a pair of parallel spaced terminals at each end of the sleeve, a pair of thin centrally perforated washers of non-wetting insulating material within the sleeve, each of said washers contacting one of said terminals, and a thin disc of solder adapted to melt at a predetermined temperature, said disc of solder within the sleeve and contacting both washers, the switch so arranged and constructed that when heat is applied to the switch the solder melts and forms a ball within the perforations of the washers due to its surface tension thus contacting and wetting both terminals.

References Cited in the file of this patent

UNITED STATES PATENTS

| | | |
|---|---|---|
| 734,456 | Brett | July 21, 1903 |
| 1,015,119 | Asmus | Jan. 16, 1912 |
| 1,348,338 | Vandegrift | Aug. 3, 1920 |
| 1,812,718 | Russell | June 30, 1931 |
| 1,825,052 | Cleveland | Sept. 29, 1931 |
| 1,856,715 | Lyndon | May 3, 1932 |